(12) United States Patent
Heydenrych et al.

(10) Patent No.: US 10,786,806 B2
(45) Date of Patent: Sep. 29, 2020

(54) OXYGENATE REDUCTION CATALYST AND PROCESS

(71) Applicant: University of Pretoria, Pretoria (ZA)

(72) Inventors: Michael Heydenrych, Centurion (ZA); Olinto Del Fabbro, Pretoria (ZA); Walter Focke, Pretoria (ZA); Frederick Labuschagne, Pretoria (ZA); Ryan Merckel, Pretoria (ZA)

(73) Assignee: University of Pretoria, Pretoria (ZA)

( * ) Notice: Subject to any disclaimer, the term of this patent is extended or adjusted under 35 U.S.C. 154(b) by 252 days.

(21) Appl. No.: 15/765,475

(22) PCT Filed: Oct. 4, 2016

(86) PCT No.: PCT/ZA2016/050039
§ 371 (c)(1),
(2) Date: Apr. 2, 2018

(87) PCT Pub. No.: WO2017/063004
PCT Pub. Date: Apr. 13, 2017

(65) Prior Publication Data
US 2019/0070593 A1 Mar. 7, 2019

(30) Foreign Application Priority Data

Oct. 5, 2015 (ZA) ................. 2015/07340

(51) Int. Cl.
*B01J 27/04* (2006.01)
*C10G 1/08* (2006.01)
(Continued)

(52) U.S. Cl.
CPC .............. *B01J 27/04* (2013.01); *B01J 21/16* (2013.01); *B01J 21/20* (2013.01); *B01J 27/30* (2013.01);
(Continued)

(58) Field of Classification Search
CPC ... B01J 27/04; B01J 21/16; B01J 21/20; B01J 27/30; B01J 38/02; C10G 1/086;
(Continued)

(56) References Cited

U.S. PATENT DOCUMENTS 3,864,097 A 2/1975 Urban
2009/0294324 A1 12/2009 Brandvold et al.
(Continued)

FOREIGN PATENT DOCUMENTS

| EP | 1719811 A1 | 11/2005 |
| EP | 2105486 A1 | 9/2009 |
| WO | WO 2006/037368 A1 | 4/2006 |
| WO | WO 2014/023758 A2 | 2/2014 |

*Primary Examiner* — Patricia L. Hailey
(74) *Attorney, Agent, or Firm* — Knobbe Martens Olson & Bear, LLP (57) ABSTRACT

The invention provides a catalyst system and method for the deoxygenation of hydrocarbons, such as bio-oil, using a sulphide-sulfate or an oxide-carbonate (LDH) system. The invention extends to a pyrolysis process of a carbonaceous bio-mass wherein a first combustion zone is carried out in one or more combustion fluidised beds in which a particulate material including chemically looping deoxygenation catalyst particles is fluidised and heated, and a second pyrolysis zone carried out in one or more pyrolysis fluidised beds in which the hot particles, including the catalyst particles, heated in the combustion zone are used for pyrolysis of the bio-mass, said combustion zone being operated at a temperature of from 250° C. to 1100° C., typically around 900° C., and the pyrolysis zone being operated at a temperature of from 250° C. to 900° C., typically 450° C. to 600° C., said catalyst particles being oxygenated in the pyrolysis zone in the presence of oxygenates and regenerated in the combustion zone either by calcining to drive off the carbon oxides, such as $CO_2$, or by reduction to its form which is active for deoxygenation of the pyrolysis oil.

17 Claims, 6 Drawing Sheets

(51) Int. Cl.
*C10G 3/00* (2006.01)
*C10G 1/10* (2006.01)
*B01J 21/16* (2006.01)
*B01J 21/20* (2006.01)
*B01J 27/30* (2006.01)
*B01J 38/02* (2006.01)

(52) U.S. Cl.
CPC .............. *B01J 38/02* (2013.01); *C10G 1/086* (2013.01); *C10G 1/10* (2013.01); *C10G 3/40* (2013.01); *C10G 3/45* (2013.01); *C10G 3/49* (2013.01); *C10G 3/57* (2013.01); *C10G 2300/1011* (2013.01); *C10G 2300/1014* (2013.01); *Y02P 30/20* (2015.11)

(58) Field of Classification Search
CPC ... C10G 1/10; C10G 3/40; C10G 3/45; C10G 3/49; C10G 3/57; C10G 2300/1011; C10G 2300/1014; Y02P 30/20
USPC ........................................................ 502/316
See application file for complete search history.

(56) References Cited

U.S. PATENT DOCUMENTS

| | | | |
|---|---|---|---|
| 2010/0105970 A1* | 4/2010 | Yanik | C10G 1/006 585/240 |
| 2010/0120106 A1* | 5/2010 | Kohn | C12P 7/04 435/160 |
| 2011/0094147 A1* | 4/2011 | Bartek | C10G 1/06 44/282 |
| 2011/0201855 A1 | 8/2011 | Marinangeli et al. | |
| 2011/0232166 A1 | 9/2011 | Kocal | |
| 2013/0261362 A1* | 10/2013 | Fingland | B01J 23/002 585/324 |
| 2015/0190788 A1* | 7/2015 | Vasic | B01J 21/16 201/2.5 |
| 2015/0247095 A1* | 9/2015 | Ramirez Corredores | C10G 1/08 585/240 |
| 2019/0338194 A1* | 11/2019 | Brodeur-Campbell | C10G 45/06 |

* cited by examiner

OXYGENATE REDUCTION CATALYST AND PROCESS

INCORPORATION BY REFERENCE TO RELATED APPLICATIONS

Any and all priority claims identified in the Application Data Sheet, or any correction thereto, are hereby incorporated by reference under 37 CFR 1.57. This application is the national phase under 35 U.S.C. § 371 of prior PCT International Application No. PCT/ZA2016/050039 which has an International Filing Date of Oct. 4, 2016, which designates the United States of America, and which claims priority to South Africa Application No. 2015/07340 filed Oct. 5, 2015. Each of the aforementioned applications is incorporated by reference herein in its entirety, and each is hereby expressly made a part of this specification.

FIELD OF THE INVENTION

The invention relates to a catalyst for reduction of oxygenates, a use for such a catalyst, and processes using said catalyst. One such type of process is reduction of oxygenates in bio-oils produced from carbonaceous material of plant origin.

BACKGROUND TO THE INVENTION

Sourcing secondary materials from wood such as pulp, dissolving pulp, or lignin involves the thermochemical degradation through the use of moderate temperatures and chemicals readily reactive with wood. Research into developing other materials from wood such as fuel oils and chemicals has made use of similar thermochemical processes albeit at harsher conditions. The degree to which wood is thermally and/or chemically degraded will determine the type of products obtained. Subjecting wood to moderately high temperatures of between 400° C.-500° C. using fast heating rates produces a fuel rich in valuable chemicals called pyrolysis oil.

Pyrolysis oil is difficult to process into more useful products mostly due to its high oxygen content. The presence of oxygenated substituents in the pyrolysis oil causes it to be more polar, making it readily soluble with water as well as chemically unstable. Another result of the high oxygen content is the presence of organic acids, which increases the acidity of pyrolysis oil.

Upgrading pyrolysis oil would therefore necessitate the removal of oxygen-based substituents.

In situ catalytic upgrading of pyrolysis oil has been used successfully to deoxygenate pyrolysis oil, thereby rendering it more useful. Deoxygenation occurs through the removal of oxygen in the form of either water (dehydration) or carbon oxides (decarboxylation and decarbonylation). The hydrogen and/or carbon which form the backbone of pyrolysis oil are usually sacrificed during deoxygenation reactions. With hydrogen contributing a higher heating value to pyrolysis oil compared to carbon, it is preferred to achieve deoxygenation via decarbonylation/decarboxylation than via dehydration.

The Applicant has previously filed patent applications PCT/ZA2011/000067 for a Fluidised Bed Pyrolysis Apparatus and Method which includes the use of a combustion zone and a separate pyrolysis zone. Said apparatus includes two or more hot particle fluidised beds, and one or more positive displacement apparatus for the transfer of hot particles between two or more of the beds, wherein one or more of the fluidised beds contains a combustion zone, and wherein one or more of the fluidised beds contains a pyrolysis zone. The apparatus is used for the production of bio-oil in a process including pyrolysis of a carbonaceous bio-mass, optionally in the presence of a catalyst which may be a cracking catalyst such as an acid zeolite catalyst.

In a later patent application filed by the Applicant viz. PCT/ZA2014/000027, an alternative arrangement of the two fluidised bed reaction zones is claimed, the two fluidised bed zones may be in an annular arrangement wherein a first fluidised bed zone is substantially surrounded by a second fluidised bed zone with the aperture divider being located between the first and second fluidised bed zones. The process carried out therein once again produced bio-oil from biomass with the possible use of a catalyst in the pyrolysis process, and again the same catalysts are proposed as in the earlier patent application of the Applicant.

The Applicant has now identified one or more shortcomings of the bio-oil products produced by the process of the above two patent applications. In particular, the bio-oil is quite high in oxygenates and has an unacceptable Carbon to Oxygen ratio and a very low Hydrogen to Carbon ratio, while also having a lower than required heating value.

In an attempt to address the above shortcomings, after extensive research and experimentation, the Applicant now proposes the invention described below as at least a partial solution thereto.

SUMMARY OF THE INVENTION

In normal fast pyrolysis, bio-oil yield is maximum at temperatures around 500° C., where approximately 60% of the biomass feed (on a dry basis) is converted to bio-oil.

This bio-oil is highly reactive, partly due to the high oxygen content, which is characteristic of the original biomass.

The invention relates to two chemical looping deoxygenation catalyst systems useful for the reduction of oxygenates in bio-oil and other plant origin liquid hydrocarbons, such as oil seed derived bio-diesel.

In one embodiment a metal sulfide, is contacted with the bio-oil to produce metal sulfate by oxidising the sulfide to a sulfate while reducing the oxygen content of the bio-oil. This is a mechanism that effectively reduces the oxygen content thus directly producing a high quality pyrolysis-oil from a reduction-oxidation (redox) reaction. The reaction is exothermic at pyrolysis conditions and can be auto-thermal.

The metal sulfate may be reduced back to the sulfide form using carbon or char as the reducing medium, thereby removing the oxygen from the system as carbon oxides, such as $CO_2$.

In a second embodiment, layered double hydroxides (LDH) and its derivatives are used to decarboxylate crude bio-oil, achieving a similar effect as the sulfide-sulfate system, except this is an oxide-carbonate system, that again removes oxygen from the system as carbon oxides, such as $CO_2$.

The reaction of the sulfide with the pyrolysis oil may take place separately from the reaction to reduce the sulfate back to the sulfide. This is referred to as chemical looping.

In the case of chemical looping, the reaction with bio-oil may take place in conditions similar to fast pyrolysis where the biomass to be pyrolysed is heated quickly to 400° C.-500° C. in the presence of the sulfide, and the pyrolysis oil is recovered from the quenched vapours.

Alternatively, the reaction of the biomass with the sulfide may take place in the liquid phase, at conditions similar to hydrothermal liquefaction, such as 200 bar pressure and 300° C. to produce a fuel oil. However, it is foreseen that the reduction potential of the sulfide in this system may make the hydrothermal liquefaction reaction occur at much milder conditions, thereby greatly reducing the capital expense of such reactors.

As an alternative to chemical looping, it may be possible to maintain conditions whereby the sulfate is immediately converted into sulfide by ensuring that CO is continuously produced by char that is present in the system.

In this case, the metal sulfide may be considered as a catalyst. The metal sulfide or sulfate may be a fluid at reaction conditions. The metal sulfide may be attached to a catalyst support so that the catalyst behaves heterogeneously as a solid under reaction conditions, whether it is in a chemical looping system or in a catalytic system.

In the case of layered double hydroxide clays (LDH), carboxylic acids intercalate between the LDh layers, forming carbonates. These carbonates can be removed as $CO_2$ in a chemical looping system by raising the temperature, or may be desorbed as $CO_2$ at normal pyrolysis reaction conditions, in which case the LDH acts as a catalyst.

The Mg—Al form of LDH may be more effective than any other catalysts reported in the literature. However, many other combinations may be equally effective, where the metal lattice than makes up the LDH may be chosen appropriately from Al, Mg, Ca, Na, K, Li, Cr, Mn, Fe, Co, Ni and combinations of these (e.g. Mg—Ca—Al).

Thus, according to a first aspect of the invention, there is provided a catalyst system and method for the use thereof, said catalyst system including:
a chemical looping catalytically active substance which is oxidised in the presence of an oxygenate in a hydrocarbon or hydrocarbon containing product, thereby reducing the amount of oxygenate therein, which oxidised catalytically active substance is at least partially regeneratable by either reducing it under reducing conditions to its original state, or through calcining thereof to release at least some of the captured oxygenate in the form of a carbonate or the like thereby returning the catalyst to its active state for removal of oxygenate from fluid hydrocarbons.

The hydrocarbon or hydrocarbon containing product may be a pyrolysis oil, such as bio-oil.

The bio-oil may be a fluid hydrocarbonmade by the pyrolysis of biomass.

The chemical looping catalytically active substance may be selected from compounds, salts, and the like, of a Group I, Group II, transition metal, and Group III substance, with sulfur.

Thus, catalytically active substance may be a metal sulfide such as $Na_2S$, however, other compounds of sulfur may also provide adequate catalytic activity for purposes of the invention. The metal sulfide may be in the group Na, K, Ca, Mg, or from the transition metal group such as Mn, Fe, Co, Ni or Zn. The metal sulphide may be selected from the group including metalloid sulfides and post-transition metal sulfides, The chemical looping catalytically active substance may be a layered double hydroxide clay (LDH). In particular, the catalyst may be Mg—Al LDH.

However, many other combinations may be equally effective, where the metal lattice that makes up the LDH may be chosen appropriately from Al, Mg, Ca, Na, K, Li, Cr, Mn, Fe, Co, Ni, and other metals and metal combinations.

The LDH may be a calcined whereby the interlayer ions are removed and hydroxides convert to oxides. The calcined LDH is then a Layered Double Oxide (LDO).

This type of LDO is a loosely layered mixed oxide.

The catalytically active metal may be used at levels of between 1% and 99% by mass on a solid catalyst support, typically around 10%.

In use, once oxidised from its reduced state, the looping catalyst system reverts back to its active state when treated in accordance with the invention i.e. by reducing the sulfate to sulfide or through calcining the LDH to release the $CO_2$.

The invention extends to the use of a chemical looping catalyst system for the catalytic deoxygenation of a biomass hydrocarbon, wherein the catalyst is oxygenated in the presence of the oxygenate rich hydrocarbon thereby reducing the oxygenates in the hydrocarbon and the oxygen to carbon ratio, while increasing the hydrogen to carbon ratio thereof.

The use of the catalyst also reduces the quantity of the hydrocarbon as the removal of the oxygenates reduces the quantity of the hydrocarbon which was produced in the pyrolysis of the biomass.

The use of the catalyst may reduce the amount of carboxylic acids such as acetic acid and derivatives thereof in the liquid hydrocarbon.

The use of the chemical looping catalyst system may include the reducing thereof under reducing conditions in a combustion chamber or vessel under low oxygen conditions, with oxygen or a suitable oxidant being injected or introduced elsewhere in the combustion chamber above the reducing zone.

The use of the chemical looping catalyst may include the calcining of the oxidised catalyst in the combustion chamber thereby to drive off the $CO_2$ and regenerate the catalyst for re-use.

The combustion chamber may operate at a temperature used in a process of the patent applications of the Applicant.

The catalyst can be used as a combustion-pyrolysis dual reaction zone process for the production of bio-oil from biomass, wherein at least some of the particles used for transferring heat within the process are catalyst particles in accordance with this invention.

The invention extends to the use of the catalyst system of the invention for the de-oxygenation of bio-diesel.

The invention extends further to the de-oxygenation of hydrocarbons, such as pyrolysis oil, produced from pyrolysis of animal (abattoir) waste, or otherwise produced from animal waste which have high oxygenate levels.

Similarly, the invention extends to the use of the catalyst in the de-oxygenation of hydrocarbons produced by the pyrolysis of natural and/or synthetic rubber and/or plastics, for example tyres. These have low oxygen levels, but the catalyst can still refine the quality of these oils by reducing acidity. These are pyrolysis oils that are not derived from plants. (apart from the natural rubber component from latex).

The invention also extends to the use of the catalyst in the de-oxygenation of hydrocarbons produced by the pyrolysis of lignin and cellulose.

According to a third aspect of the invention, there is provided a pyrolysis process including pyrolysis of a carbonaceous bio-mass wherein a first combustion zone is carried out in one or more combustion fluidised beds in which a particulate material including chemically looping deoxygenation catalyst particles is fluidised and heated, and a second pyrolysis zone carried out in one or more pyrolysis fluidised beds in which the hot particles, including the catalyst particles, heated in the combustion zone are used for pyrolysis of the bio-mass, said combustion zone being operated at a temperature of from 250° C. to 1100° C., typically around 900° C., and the pyrolysis zone being operated at a temperature of from 250° C. to 900° C., typically 450° C. to 600° C., said catalyst particles being oxygenated in the pyrolysis zone in the presence of oxygenates in the pyrolysis oil and regenerated in the combustion zone either by calcining to drive off the carbon oxides, such as $CO_2$, or by reduction to its form which is active for deoxygenation of the pyrolysis oil.

The catalyst particles are particles substantially as described above, for example, a metal sulfide or a LDH catalyst.

The catalyst particles are circulated between the combustion fluidised bed and the pyrolysis bed so that the catalyst loops between an oxidised and a reduced or deoxygenation active state.

Fluidising gas and/or non-condensed vapours in the second fluidised bed zone may be recirculated and solid and liquid products may be removed as part of the recirculation loop and a portion of the recirculated gas and/or non-condensed vapours may be introduced into the second fluidised bed through nozzles.

Where there is a net production of gas in the recirculation loop, it may be removed as a purge stream.

The catalyst particles may pass through an aperture divider from the combustion zone into the pyrolysis zone.

The pyrolysis zone may be operated at or about atmospheric pressure.

The use of catalyst in the pyrolysis zone may allow more throughput of bio-mass because more carbon oxides such as $CO_2$ are produced and therefore the process will be less endothermic.

DESCRIPTION OF EMBODIMENTS OF THE INVENTION

The invention will now be described, by way of non-limiting example only, with reference to the accompanying diagrammatic drawings. In the drawings.

1. EXPERIMENTAL WORK ON METAL SULFIDE CATALYST SYSTEM

An experiment was used to demonstrate $Na_2S$ as a suitable oxygen scavenger during the pyrolysis of wood. *Eucalyptus grandis* sawdust was mixed together with $Na_2S$ and placed in a muffle oven heated to 500° C. The char leftover was compared to the original sample using XRD analyses. The XRD analyses confirmed the presence of sodium sulfate ($Na_2SO_4$) in the char. It is believed that the oxygen used to convert the sulfide ion into the sulfate ion was derived from oxygen contained in the wood.

A second experiment was completed, in which *E. grandis* mixed together with $Na_2S$ was pyrolysed in a nitrogen atmosphere using microwave radiation. The oil formed was found to be immiscible with water, and was remarkably different to uncatalysed pyrolysis oil produced on the same equipment.

A third experiment made use of a pyro-GC-MS apparatus to pyrolyse 3 different woody biomass feedstocks with $Na_2S$ on an alumina support, namely *E. grandis*, bagasse, and lignin. GC-MS analysis of the products showed a notable difference when compared to uncatalysed pyrolysis oil produced using the same method.

A third experiment used $Na_2S$ mixed with *E. grandis* sawdust to produce pyrolysis oil via microwave pyrolysis. For comparison, untreated *E. grandis* was pyrolysed using the same method to obtain uncatalysed oil. The $Na_2S$-derived pyrolysis oil formed black immiscible oil with a strong bitumen like smell, which readily separated from pyrolytic water that also formed during the process. In contrast the uncatalysed oil was fully miscible with water and smelled of burnt sugar, similar to that of pre-hydrolysate. The oil produced using $Na_2S$ had a calorific value 38.0% higher than the uncatalysed oil.

Based on these experiments, it has been suggested that $Na_2S$ may be a suitable chemical for use in a dual circulating fluidized bed (DCFB) system, an example of which is described in Applicants earlier PCT patent applications discussed above.

This type of system is commonly used for pyrolysis oil production. In this system the bed material is transported cyclically from the pyrolysis fluidized bed to the combustion fluidized bed and back again, taking with it any other solid materials present in the system (such as char, wood biomass or catalysts). Oxidation of $Na_2S$ to $Na_2SO_4$ would be achieved during pyrolysis. The $Na_2SO_4$ could then be transported with the bed material and char to the combustion zone. The reduction of $Na_2SO_4$ to $Na_2S$ would then take place during combustion using residual carbon as char to reform $Na_2S$. $Na_2S$ will then be transported back to the pyrolysis zone again.

Figure 8:
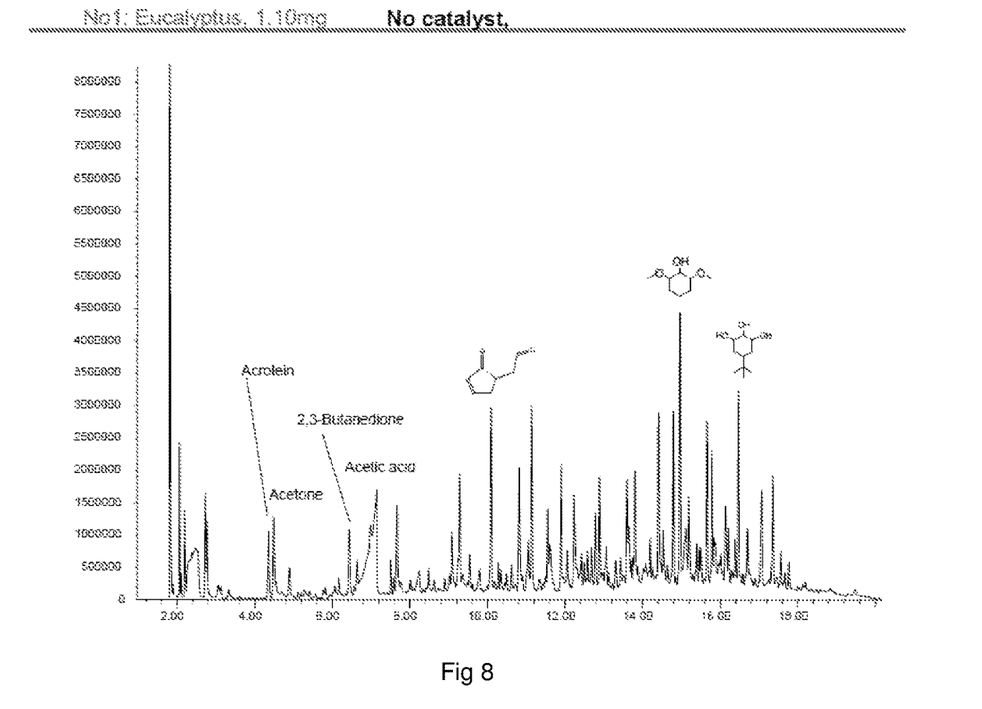
FIG. 8 shows the composition results of a pyrolysis oil produced from eucalyptus without a deoxygenation catalyst system of the invention.
Figure 9:
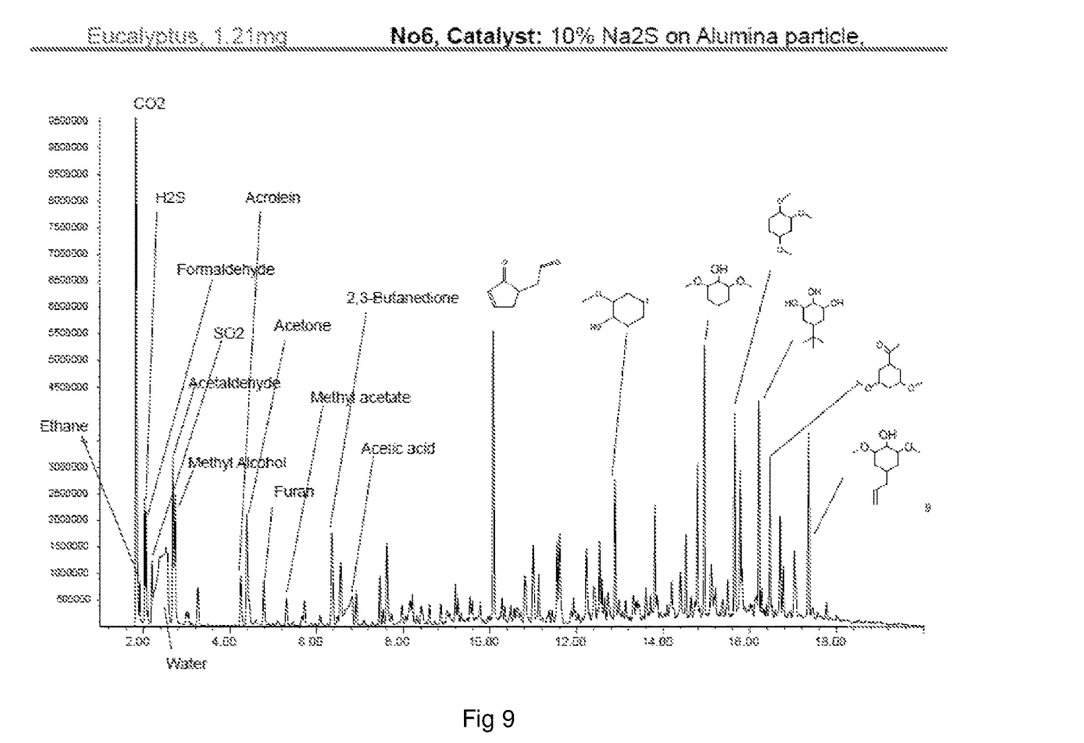
FIG. 9 shows the composition results of a pyrolysis oil produced from eucalyptus with a deoxygenation catalyst system of the invention, $Na_2S$ on an alumina support.

As can be seen from FIGS. 8 and 9, which are compositional analyses of pyrolysis oil produced from eucalyptus, by pyrolysis both without a deoxygenating catalyst and with a $Na_2S$ catalyst on an alumina support, the amount of acetic acid produced in the metal sulfide catalyst of the invention catalysed reaction is substantially less than that of the uncatalysed comparative analysis. As discussed below, the acetic acid is an indicator of the degree of deoxygenation of the bio-oil by the catalyst.

2. Experimental Work on LDH Catalyst System

Biomass was pyrolysed to pyrolysis oil using the following experimental set up and the bio-oil thus produced was analysed to determine, amongst other things, its O/C ratio, H/C ratio, Higher Heating Value (HHV) and composition (including acetic acid).

Biomass Used and Sample Preparation:

*E. grandis* was milled using a particle size reduced using cutting mill to a particle size distribution between 150 μm and 250 μm at a moisture content measured as 8.88%.

Various oxygen scavenging catalysts were used for the experiment including Mg—Al LDH and Ca—Al LDH on alumina support at a 10% m/m loading.

For comparative purposes, an experiment was also conducted using zeolite as the catalyst and an uncatalysed experiment was conducted as well.

The results of these experiments are shown in FIGS. 1 to 7 below.

Equipment and Methods Used:

pyrolysis-GC/MS (Py-GC/MS)—Shimadzu multi-functional pyrolyser EGA/PY-3030D from Frontier Labs, Japan Evolved gas analysis (EGA-MS) was used to define the thermal desorption zone using a thermal programme of 100° C. to 600° C. at 20° C./min Sample sizes were in the range of 1.10 mg±0.1 mg Samples reach pyrolytic temperatures in less than 20 ms As can be seen from the figures, where no deoxygenation catalyst was used, the O/C ratio for the pyrolysis oil produced was 0.48 with the H/C ratio being 1.74 while the HHV was 23.2 MJ/kg. Where Zeolite was used at a temperature of 500° C., the O/C ratio was 0.35, the H/C ratio was 1.58 and the HHV was 26.97 MJ/kg.

Figure 1:
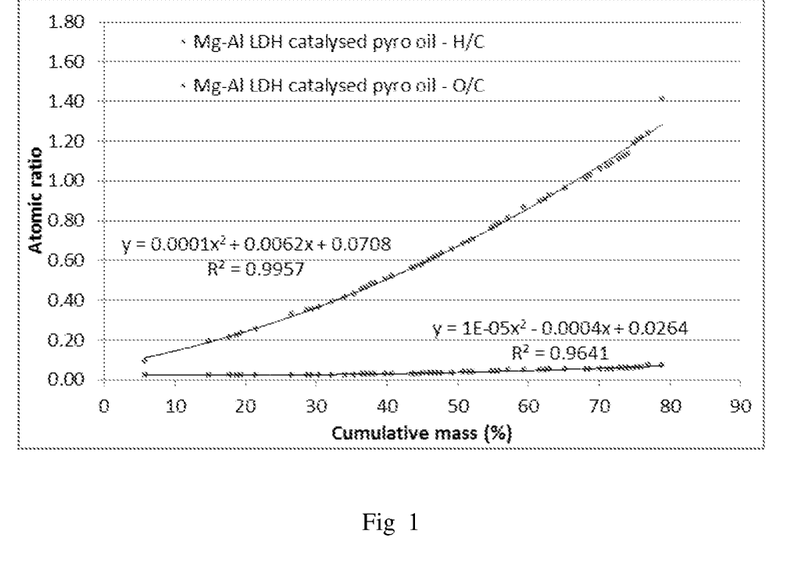
FIG. 1 shows the results of the pyrolysis oil deoxygenation for a Mg—Al LDH looping catalyst system.
Figure 2:
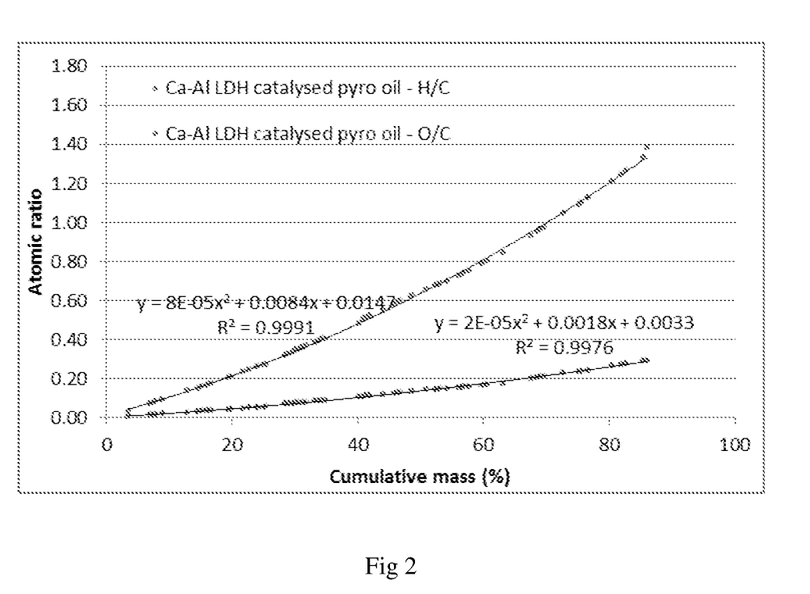
FIG. 2 shows the results of the pyrolysis oil deoxygenation for a Ca—Al LDH looping catalyst system.
Figure 3:
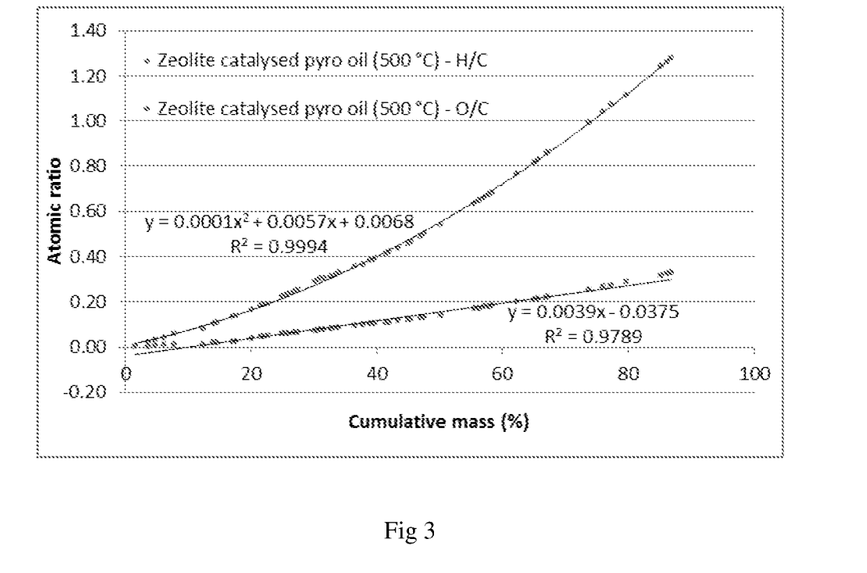
FIG. 3 shows the results of the pyrolysis oil deoxygenation for a zeolite catalyst system.
Figure 4:
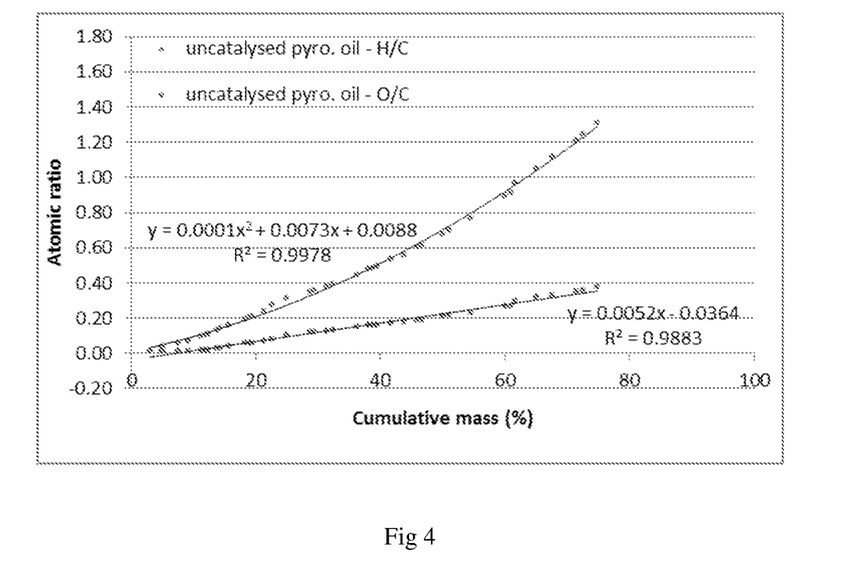
FIG. 4 shows comparative data to FIGS. 1 to 3 for an uncatalysed pyrolysis production of pyrolysis oil.

With the use of LDH catalysts of the invention, the picture is quite different and the results obtained for Mg—Al LDH are O/C ratio of 0.02, H/C ratio of 1.69 and a HHV of over 40 MJ/kg. The results for Ca—Al LDH although slightly lower are still superior to that of the uncatalysed or zeoilte catalysed pyrolysis of biomass to bio-oil with an O/C ratio of 0.35, an H/C ratio of 1.65 and HHV of 28.8 MJ/kg.

Figure 10:
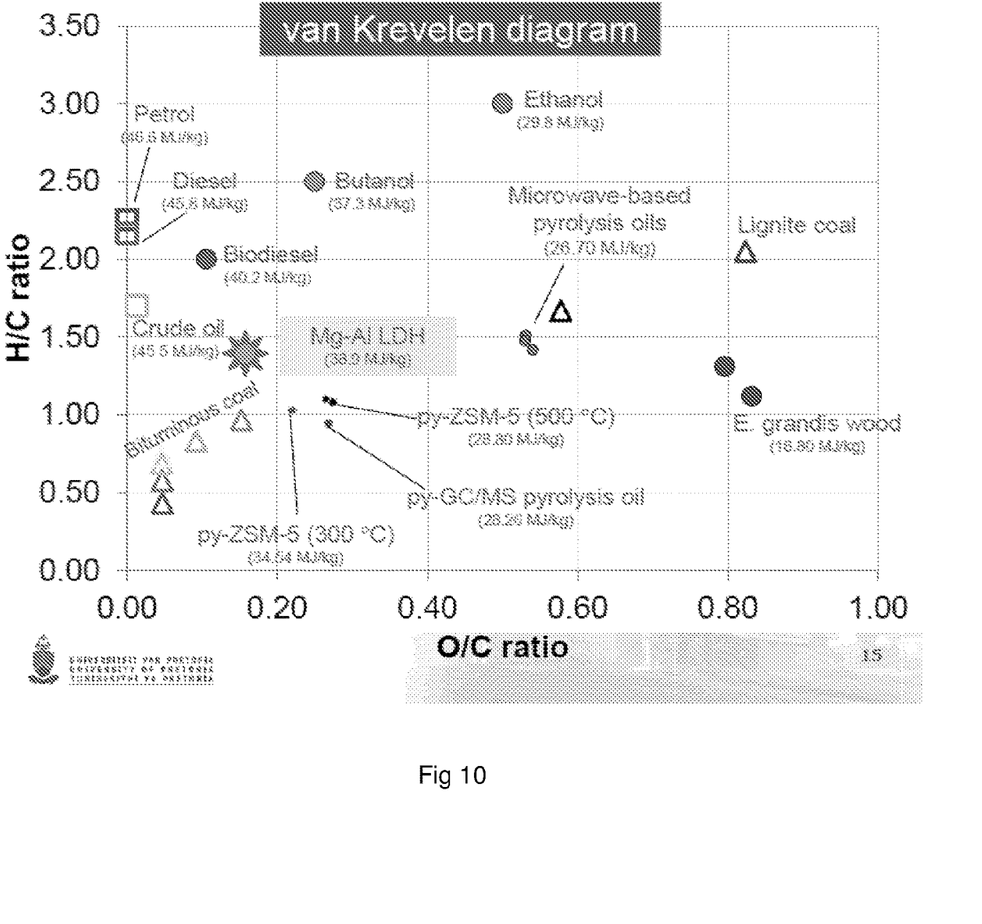
FIG. 10 is a van Krevelen diagram relevant to the invention.

In FIG. 10 a van Krevelen diagram sets out the above ratios and the position of the bio-oil produced using the Mg—Al LDH catalyst as deoxygenating catalyst.

Figure 5:
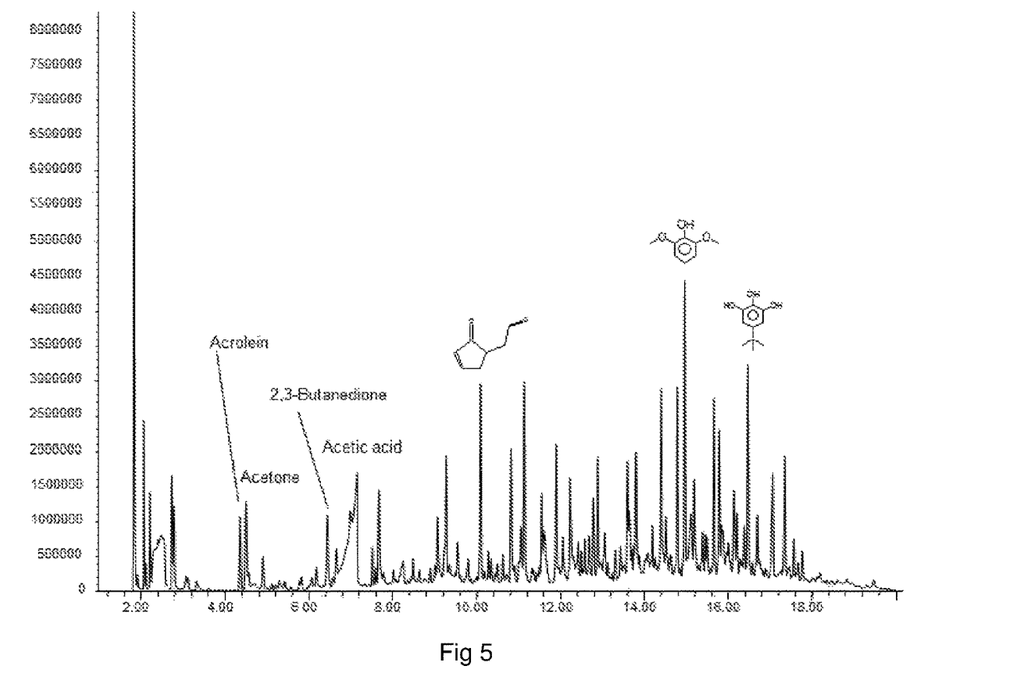
FIG. 5 shows the composition analysis results of the pyrolysis oil deoxygenation for a Ca—Al LDH looping catalyst system.
Figure 6:
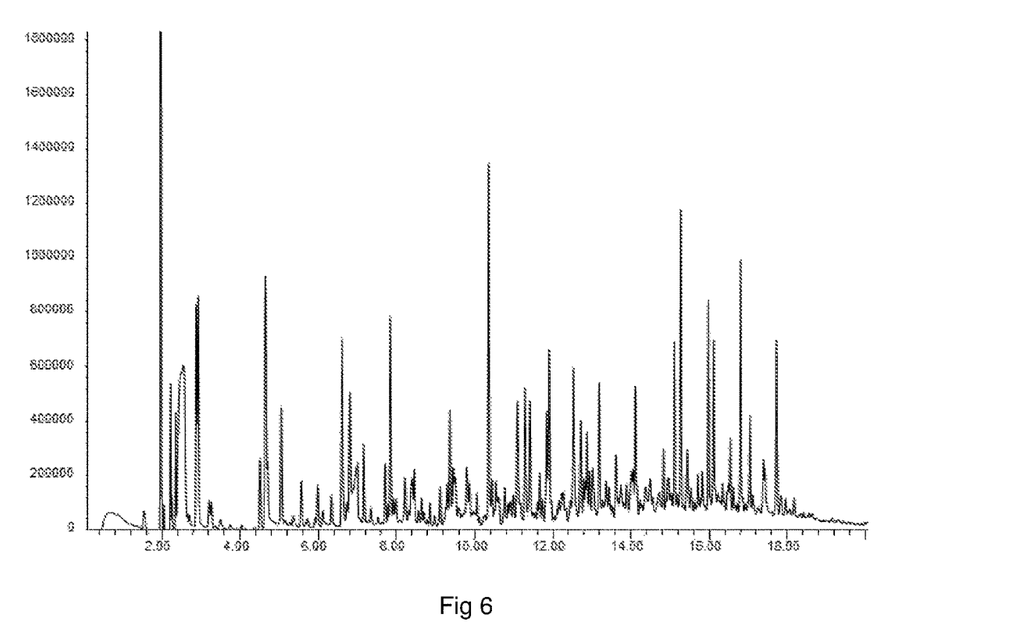
FIG. 6 shows the composition results of the pyrolysis oil produced without a deoxygenation catalyst system of the invention.
Figure 7:
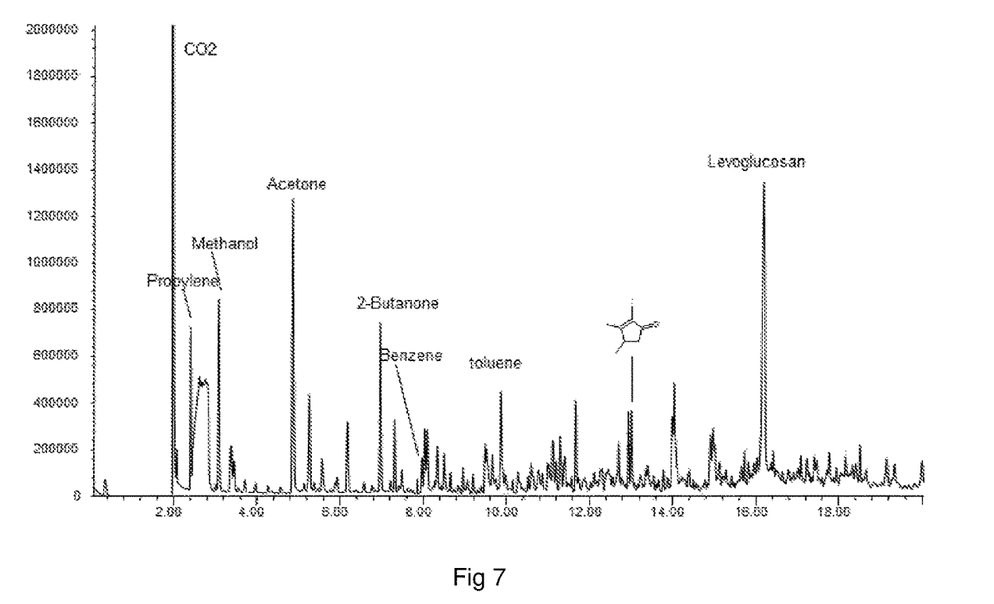
FIG. 7 shows the composition analysis results of the pyrolysis oil deoxygenation for a Mg—Al LDH looping catalyst system.

Again, the advantages of using the LDH catalyst system for deoxygenation of the pyrolysis oil is clear from FIGS. 5 to 7 and it can be seen that less acetic acid is produced when the LDH catalyst was used then when it was not used. This also indicated a reduction in the yield of the pyrolysis oil from the biomass, however, the pyrolysis oil which is yielded is of a superior quality due to its reduced oxygenate levels.

GC-MS chromatograms of uncatalysed pyrolysis oil in FIGS. 5 to 7 show that acetic acid which is typically formed from acetyl groups present in hemicellulose is present in pyrolysis oil as a result and the acetic acid peak clearly visible and can be seen to be reduced where the catalyst system of the invention was used.

By using LDH as a chemical looping catalyst system in pyrolysis, it always decreases the product yield by stripping oxygen from the product. The same applies to the metal sulfide system.

The invention claimed is:

1. A hydrocarbon deoxygenation catalyst system comprising:
    a chemical looping catalytically active substance that is oxidized in a presence of oxygenates in a fluid hydrocarbon product or a fluid hydrocarbon-containing product, thereby reducing an amount of the oxygenate therein, wherein the oxidized chemical looping catalytically active substance is at least partially regeneratable by either reducing under reducing conditions, or by calcining to release at least some of a captured oxygenate in a form of a carbonate, thereby returning the chemical looping catalytically active substance to an active state for deoxygenation of a pyrolysis oil, wherein the chemical looping catalytically active substance is on a solid catalyst support at a level of between 1% and 99% by mass in a form of a particulate material;
    a first combustion zone adapted to be operated at a temperature of from 250° C. to 1100° C. in one or more combustion fluidized beds, wherein the first combustion zone is adapted to fluidize and heat the particulate material, thereby regenerating the oxidized chemical looping catalytically active substance either by calcining to drive off carbon oxides or by reducing to the active state; and
    a second pyrolysis zone operated at a temperature of from 250° C. to 900° C. in a pyrolysis bed, wherein the pyrolysis bed is a fluidized bed, wherein the second pyrolysis zone is adapted to pyrolize a bio-mass to yield the pyrolysis oil containing the oxygenates, and wherein the chemical looping catalytically active substance is oxidized in a presence of the oxygenates.

2. The system of claim 1, wherein the chemical looping catalytically active substance is a compound or salt of a Group I substance with sulfur, a Group II substance with sulfur, a transition metal with sulfur, or a Group III substance with sulfur.

3. The system of claim 1, wherein the chemical looping catalytically active substance is a metal sulfide wherein the metal is selected from the group consisting of Na, K, Ca, Mg, a transition metal, Mn, Fe, Co, Ni, and Zn.

4. The system of claim 3, wherein the metal sulfide is $Na_2S$.

5. The system of claim 1, wherein the chemical looping catalytically active substance is a metalloid sulfide or a post-transition metal sulfide.

6. The system of claim 1, wherein the chemical looping catalytically active substance is a layered double hydroxide clay.

7. The system of claim 6, wherein a metal lattice that makes up the layered double hydroxide clay comprises a metal selected from the group consisting of Al, Mg, Ca, Na, K, Li, Cr, Mn, Fe, Co, Ni, and combinations thereof.

8. The system of claim 7, wherein the chemical looping catalytically active substance is a Mg—Al layered double hydroxide clay.

9. The system of claim 6, wherein the layered double hydroxide clay is calcined, whereby interlayer ions are removed and hydroxides convert to oxides.

10. The system of claim 1, wherein the chemical looping catalytically active substance is on the solid catalyst support at a level of 10% by mass.

11. A process for pyrolysis of a carbonaceous bio-mass, comprising:
    fluidizing and heating a particulate material including chemically looping deoxygenation catalyst particles in a first combustion zone operated at a temperature of from 250° C. to 1100° C. in one or more combustion fluidized beds;
    introducing a bio-mass and the fluidized and heated particulate material into a second pyrolysis zone operated at a temperature of from 250° C. to 900° C. in a pyrolysis bed, wherein the pyrolysis bed is a fluidized bed, whereby the bio-mass is pyrolyzed to yield a pyrolysis oil, and whereby the chemically looping deoxygenation catalyst particles are oxygenated in a presence of oxygenates in the pyrolysis oil; and regenerating the oxygenated chemically looping deoxygenation catalyst particles in the first combustion zone either by calcining to drive off carbon oxides or by reducing to a form which is active for deoxygenation of the pyrolysis oil.

12. The process of claim 11, wherein the chemically looping deoxygenation catalyst particles are metal sulfide particles or layered double hydroxide clay catalyst particles.

13. The process of claim 11, wherein the chemically looping deoxygenation catalyst particles are circulated between the one or more combustion fluidized beds and the pyrolysis bed so that the chemically looping deoxygenation catalyst particles loop between an oxidized state and a reduced or deoxygenation active state.

14. The process of claim 11, wherein a fluidizing gas and/or non-condensed vapors in the second pyrolysis zone are recirculated and solid products and liquid products are removed as part of a recirculation loop and a portion of the recirculated fluidizing gas and/or the recirculated non-condensed vapors is introduced into the second pyrolysis zone through nozzles.

15. The process of claim 14, wherein where there is a net production of gas in the recirculation loop, it is removed as a purge stream.

16. The process of claim 11, wherein the chemically looping deoxygenation catalyst particles pass through an aperture divider from the first combustion zone into the second pyrolysis zone.

17. The process of claim 11, wherein the second pyrolysis zone is operated at or about atmospheric pressure.

* * * * *